United States Patent [19]

Müller

[11] Patent Number: 4,724,365

[45] Date of Patent: Feb. 9, 1988

[54] CONTROL CIRCUIT FOR DIRECT CURRENT BRUSHLESS MOTORS

[75] Inventor: Rolf Müller, St. Georgen/Schwarzwald, Fed. Rep. of Germany

[73] Assignee: Papst-Motoren GmbH & Co. KG, St Georgen/Schwarzwald, Fed. Rep. of Germany

[21] Appl. No.: 850,564

[22] Filed: Apr. 11, 1986

[51] Int. Cl.[4] .............................................. H02P 6/02
[52] U.S. Cl. .................................. 318/254; 318/138; 318/439
[58] Field of Search ....................... 318/138, 254, 439; 310/68 R

[56] References Cited

U.S. PATENT DOCUMENTS

| | | | |
|---|---|---|---|
| 3,906,320 | 9/1975 | Doemen | 318/254 A X |
| 4,030,005 | 6/1977 | Doemen | 318/138 |
| 4,127,799 | 11/1978 | Nakamura et al. | 318/254 A X |
| 4,230,976 | 10/1980 | Müller | 318/138 |
| 4,374,347 | 2/1983 | Müller | 318/138 |
| 4,379,984 | 4/1983 | Müller | 318/254 |
| 4,473,782 | 9/1984 | Reinhardt et al. | 318/254 |

FOREIGN PATENT DOCUMENTS

| | | | |
|---|---|---|---|
| 2802263 | 7/1978 | Fed. Rep. of Germany | 318/254 |
| 55-109189 | 8/1980 | Japan | 318/138 |
| 57-160386 | 10/1982 | Japan | 318/254 |
| 2,077,530 | 12/1981 | United Kingdom | 318/254 |

*Primary Examiner*—Bentsu Ro
*Attorney, Agent, or Firm*—Spencer & Frank

[57] ABSTRACT

An actuation circuit for direct current motors without collectors having at least one analogously operating galvanomagnetic sensor, of the Hall generator type which serves to control the currents in at least two end stage transistors. At least two differential amplifier stages having a high voltage gain and a high input resistance feed the amplified output signal of the galvanomagnetic sensor to the end stage transistors. Ohmic voltage dividers are provided for generating time pauses between the "on" states of the end stage transistors, these ohmic voltage dividers utilizing part of the voltage between the control terminals of the at least one galvanomagnetic sensor to form switching thresholds for the at least two differential amplifier stages. At least one capacitive coupling element is disposed between the outputs of the galvanomagnetic sensor and the inputs of the differential amplifier stages to transfer the alternating voltage component of the output signal of the galvanomagnetic sensor to the differential amplifier stages and to the direct voltage component.

18 Claims, 8 Drawing Figures

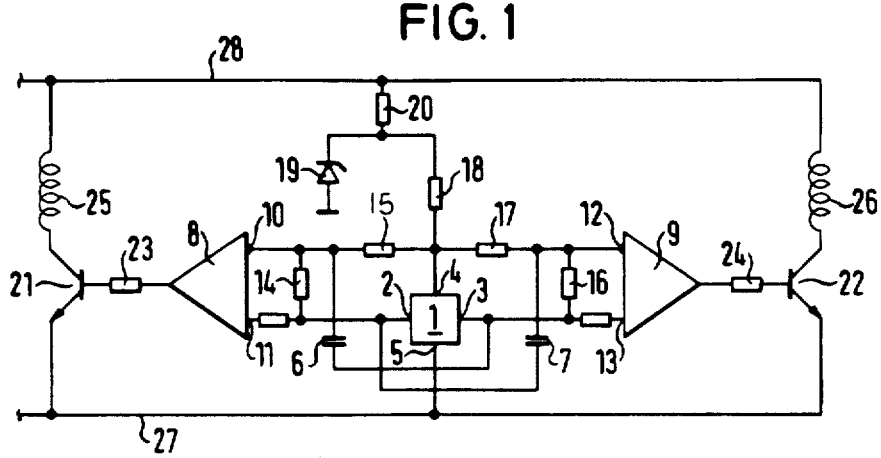
FIG. 1
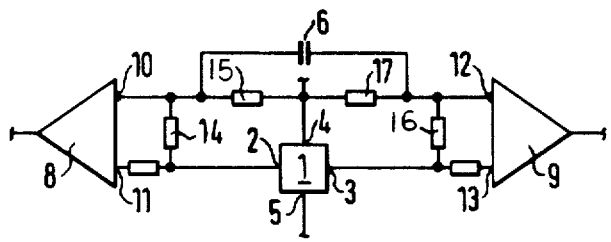
FIG. 2
FIG. 3
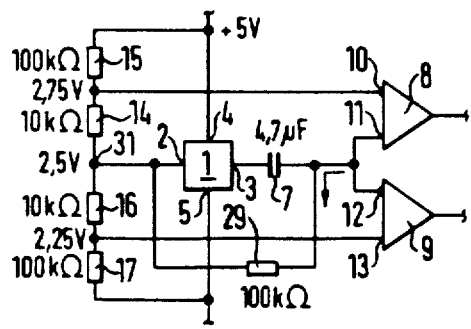
FIG. 4
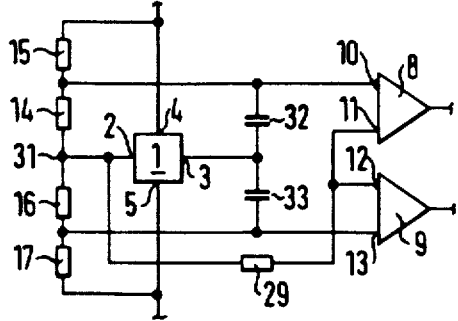
FIG. 5

CONTROL CIRCUIT FOR DIRECT CURRENT BRUSHLESS MOTORS

BACKGROUND OF THE INVENTION

The invention relates to an actuation circuit for direct current motors without collectors having at least one analogously operating galvanomagnetic sensor, for example of the type of a Hall generator or another position sensor. The sensor serves to control the currents in at least two end stage transistors which are actuated via threshold devices, particularly at least one differential amplifier stage having a high voltage gain and a high input resistance, so as to amplify the output signal of the galvanomagnetic sensor. To produce time pauses between the "on" states of the end stage transistors, ohmic voltage dividers are provided which utilize part of the voltage between the control terminals of the galvanomagnetic sensor to form switching thresholds.

From an earlier German patent application by applicant (DE-AS No. 2,419,432) it is known to obtain a threshold value voltage from the control voltage of the Hall generator by way of voltage dividers so as to be able to prevent each one of the two end stage transistors from becoming conductive in a defined, small range of the Hall voltage.

Moreover, from a coupling capacitor patent (German Pat. No. 2,463,005) it is known to utilize capacitors to transmit the signal of the Hall generator either directly or after preamplification, via suitably dimensioned nonlinear members to the end stage transistors so that the latter become free of current when the motor is in the blocked state.

In the second circuit, relatively large capacitors are required for a sufficiently long and strong actuation of the end stage transistors so that these capacitors must be manufactured as tantalum capacitors. A further drawback of this prior art circuit is that the current amplification of the end stage transistors, which are connected in a Darlington configuration, i.e. the product of the current gains of the individual transistors, has a considerable influece, on the one hand, on the turn-on time required for reliable operation and, on the other hand, on the turn-off time of the end stage transistors which is important for the case of blocking. To solve this problem, transistors must therefore be employed which have current amplification values within close tolerances.

SUMMARY OF THE INVENTION

It is an object of the invention to avoid expensive components and make available a simple circuit which, on the one hand, permits, with moderately high capacitance values for the coupling capacitors, the realization of a turn-on time which is sufficiently long for reliable motor start-up and, on the other hand, in the blocked state assures rapid and defined turn-off of the end stage transistors.

The basic idea of the solution according to the invention is to feed, via coupling capacitors, a signal, obtained, for example, from the Hall generator, i.e. an alternating voltage signal superposed on the direct voltage, to two amplifier stages whose input resistances are approximately the same and simultaneously, via suitably dimensioned ohmic voltage dividers, feed a direct voltage to these two amplifier stages with the effect at the inputs of the amplifier stages that both end stage transistors connected to the outputs are switched off when the alternating voltage signal of the Hall generator signal transmitted via a coupling capacitor to the inputs of the amplifier stages is not present. Instead of a Hall generator, a similarly acting other component can also be used as the position detector insofar as a similar signal can be obtained therefrom.

The direct voltage signals for generating suitable threshold values for turning on the end stage transistors are obtained from the control voltage of the preferably employed Hall generator which is provided at least once. In this way, a very uniform compensation of the temperature curve of the Hall generator output signals is realized on the basis of the identical temperature curve of the internal resistance of the Hall generator control path.

Hall generators based on iridium antimonide have, for example, a temperature coefficient for the Hall voltage of $-1.5 \ldots -2\%/°K$. Thus a temperature increase by, for example, 40° C. reduces the amplitude of the output voltage to about 50% of its original value.

At the same time, if the control current is constant, the voltage drop across the control path of the Hall generator likewise drops to 50% so that an auxiliary voltage derived from this voltage by means of voltage dividers also has the same temperature curve. Thus, the ratio of threshold voltage to the amplitude of the output voltage remains constant and the range in which neither one nor the other end stage transistor is turned on is substantially independent of the temperature.

Further details, features and advantages of the present invention will become evident from the description below of embodiments of the actuation circuit according to the invention of the drawing.

BRIEF DESCRIPTION OF THE DRAWINGS

It is shown in:

FIG. 1, a basic circuit diagram of a first embodiment of the actuation circuit according to the invention, with the end stage transistors and stator windings being excited thereby;

FIG. 2, a circuit simplified compared to FIG. 1 and employing only one coupling capacitor;

FIG. 3, another embodiment of this circuit;

FIG. 4, a further modification of the circuit;

FIG. 5, a circuit including another coupling;

DESCRIPTION OF THE PREFERRED EMBODIMENTS

Figure 6:
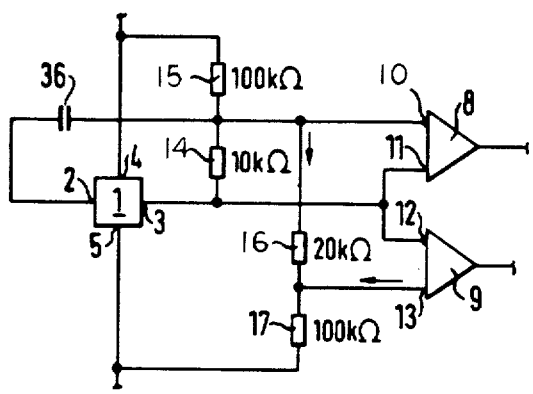
FIG. 6, another modification.

The basic structure of an actuation circuit is known from the above-mentioned (DE-AS No. 2,419,432) so that it will be described only briefly here.

According to FIG. 1, the series connections of stator windings 25, 26 with the collector path of a respectively associated end stage transistor 21, 22 lie between the two voltage rails 27, 28. The base of each end stage transistor is actuated via a resistor 23, 24 by a differential amplifier 8 and 9, respectively, which is preferably designed in integrated form and constitutes comparators and operational amplifiers, respectively. Between the two voltage rails 27 and 28 lies the series connection of a voltage divider composed of two resistors 18 and 20 with the input terminals 4, 5 of a galvanomagnetic sensor 1 which is preferably a Hall generator. A stabilized voltage is generated by the electronic system via a Zener diode 19 which is connected to the connecting point between the two resistors 18 and 20. Control terminal 4 of galvanomagnetic sensor 1 is connected with one end of each voltage divider 15, 14 or 17, 16, respectively. The other ends of the two voltage dividers are connected to the one or the other output terminal 2, 3, respectively, of galvanomagnetic sensor 1. These output terminals are preferably also in communication, via resistors, with one input 11 or 13, respectively, of differential amplifier stages 8, 9. The respectively other input 10 or 12 of the two differential amplifier stages 8, 9 is connected to the respective center tap of the two voltage dividers 14, 15 and 16, 17.

According to the invention, at least one capacitive coupling element is connected with the one or the other output terminal 2 or 3 of the galvanomagnetic sensor 1. In the first embodiment according to FIG. 1, a capacitor 6 is disposed between the center tap of voltage divider 14,15 and the output terminal 3 of the galvanomagnetic sensor 1 and a coupling capacitor 7 is disposed between the center tap of voltage divider 16,17 and the other output terminal 2 of galvanomagnetic sensor 1.

As already mentioned above, voltage dividers 14,15 and 16,17 serve to derive, in addition to the control voltage for galvanomagnetic sensor 1, also threshold voltages which block both end stage transistors via differential amplifier stages over a defined range of the Hall voltage. The provision of capacitive coupling elements, namely capacitors 6 and 7, on the other hand, bring the alternating voltage components of the output voltages of the galvanomagnetic sensor to inputs 10 and 12, respectively, of the two differential amplifier stages. If the alternating voltage signal is not present, this indicates that the motor is blocked and in this situation the end stage transistors are blocked.

FIG. 2 shows the significant elements of a further embodiment of the actuation circuit according to the invention. In modification of the circuit according to FIG. 1, only a single capacitive coupling element is provided, namely capacitor 6, which connects the center taps of the two voltage dividers 14,15 and 16,17. This circuit arrangement produces essentially the same effect as the circuit arrangement according to FIG. 1.

FIG. 3 shows a further embodiment of the actuation circuit according to the invention in which the center taps of the two voltage dividers 14,15 and 16,17, respectively, are connected with inputs 10 and 13, respectively, of the two differential amplifier stages 8, 9. The respective end of the two voltage dividers 14,15 and 16,17 is again connected with one of control terminals 4 and 5, respectively, while the other two ends of the two voltage dividers are brought together at a connecting point 31 which is in communication, via a single capacitor 6, with one output terminal 2 of galvanomagnetic sensor 1 while the other output terminal 3 is in communication, preferably via a resistor 30, with the two respectively other inputs 11, 12 of the two differential amplifier stages 8, 9. Preferably, resistor 30 has a resistance value which is equal to one-half the differential internal resistance across the respective center taps of voltage dividers 14,15 and 16,17, respectively.

In the embodiment according to FIG. 4, the actuation circuit according to FIG. 3 is modified in that the common connection point 31 between the two voltage dividers is connected with the one output terminal 2 of galvanomagnetic sensor 1, while its other output terminal 3 is connected, via capacitor 7, with the inputs 11 and 12, respectively, of the two differential amplifier stages 8, 9. Preferably, a resistor 29 may connect the one output terminal 2 of galvanomagnetic sensor 1 with the two above-mentioned inputs 11 and 12, respectively. This resistor 29 as well preferably has a resistance value which is equal to one-half the differential internal resistance across the respective center taps of the two voltage dividers.

FIG. 4 shows preferred dimensions and voltage values. For example, the two voltage dividers may be composed of resistors of 100k Ohm an 10k Ohm, while resistor 29 may have a value of 100k Ohm and capacitor 7 may have a capacitance of 4.7 $\mu$F. If the voltage across galvanomagnetic sensor 1 is +5 Volt, then the voltage values of 2.75 V and 2.25 V result at the center taps of the two voltage dividers 14,15 and 16,17.

In the embodiment according to FIG. 5, in modification of the actuation circuit according to FIG. 4, the other output terminal 3 of galvanomagnetic sensor 1 is connected, each time via a capacitor 32 and 33, respectively, with the center taps of the two voltage dividers 14,15 and 16,17, respectively.

Figure 7:
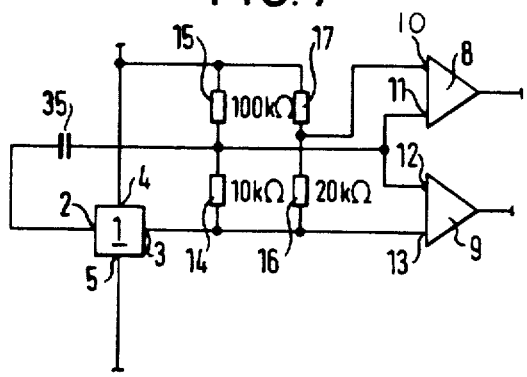
FIG. 7, a further variation.

While the actuation circuits of FIGS. 1 to 5 are essentially symmetrical in configuration, an assymetrical effect results at the outputs of the two differential amplifier stages 8, 9 of the embodiment of FIGS. 6 and 7.

In the embodiment according to FIG. 6, the one voltage divider 14,15 is connected between the output terminal 3 of galvanomagnetic sensor 1 and its control terminal 4, while the other voltage divider 16,17 is brought from the center tap of the first voltage divider 14,15 to the other control terminal 5 of the galvanomagnetic sensor 1. The center tap of the first voltage divider 14,15 is also in communication, via a capacitor 36, with the one output terminal 2 of galvanomagnetic sensor 1 as well as directly with input terminal 10 of differential amplifier stage 8. The center tap of the second voltage divider 16,17 lies at input 13 of the other differential amplifier stage 9, while the two respectively other inputs 11 and 12 of the two differential amplifier stages 8, 9 are connected to the other output terminal 3 of galvanomagnetic sensor 1.

In the actuation circuit according to FIG. 7, in modification to the embodiment according to FIG. 6, the input of the second voltage divider 16,17 is connected in parallel with the input of the first voltage divider 14,15, i.e. likewise connected to a control terminal 4, with its center tap being in communication with input terminal 10 of differential amplifier stage 8. In this case, inputs 11, 12 of the two differential amplifier stages 8, 9 are connected to the center tap of the first voltage divider 14,15, while the remaining input 13 of differential amplifier stage 9 is connected directly with the other output terminal 3 of galvanomagnetic sensor 1.

Figure 8:
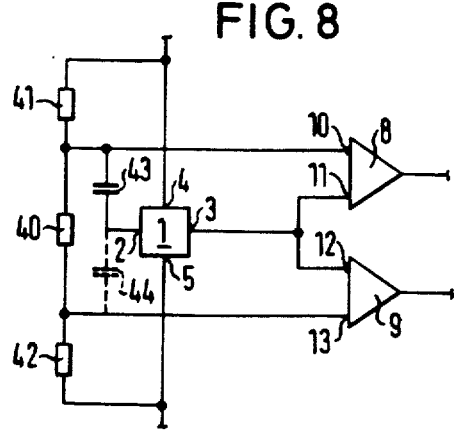
FIG. 8, a circuit employing a resistance cascade.

FIG. 8 finally shows a modification of the embodiment according to FIG. 3. In this actuation circuit, the two voltage dividers are combined so that a voltage divider results which is composed of three resistors 40, 41 and 42 and is connected via control terminals 4 and 5 of galvanomagnetic sensor 1. The two taps between resistors 40, 41 and 42 are each connected to an input of the two differential amplifier stages 8, 9, with their respectively other inputs 11, 12 being connected with the other output terminal 3 of galvanomagnetic sensor 1. The one output terminal 2 of galvanomagnetic sensor 1 is connected, via at least one capacitor 43, with the one tap of the voltage divider between resistors 40 and 41, a further capacitor 44 preferably being connected with the other tap between resistors 40 and 42.

It should also be mentioned that input terminals 10 and 12 constitute the inverting inputs and input terminals 11 and 13 constitute the noninverting inputs of the two differential amplifier stages.

I claim:

1. Actuation circuit for a brushless D.C. motor having a plurality of stator windings, comprising:
   a. a galvanomagnetic sensor having two control terminals and two output terminals;
   b. a plurality of end stage transistors, each having a control electrode and a main conductive path arranged for series connection to a respective one of the stator windings of the brushless motor;
   c. a plurality of differential amplifier stages, each having a high voltage gain and a high input resistance and provided with first and second inputs and an output, said output being connected to said control electrode of a respective one of said end stage transistors;
   d. ohmic votage dividers, one for each of said differential amplifier stages, each of said voltage dividers having a first and a second end and a center tap, with said first end being connected to an output terminal of said galvanomagnetic sensor, said second end being connected to a control terminal of said galvanomagnetic sensor and said center tap being connected to one input of a respective one of said differential amplifier stages, said voltage dividers utilizing part of a voltage between said control terminals of said galvanomagnetic sensor to form switching thresholds for said differential amplifier stages; and
   e. at least one capacitive coupling element connected between one output terminal of said galvanomagnetic sensor and one of said voltage dividers for passing an alternating voltage component of an output signal of said galvanomagnetic sensor to one of said differential amplifier stages while suppressing a direct voltage component of said output signal, thereby rendering said end stage transistors non-conductive upon blocking of said motor represented by the absence of said alternating voltage component.

2. Actuation circuit according to claim 1, wherein one of said control terminals of said galvanomagnetic sensor is a common control terminal, the second ends of all of said voltage dividers being connected to said common control terminal.

3. Actuation circuit according to claim 2, wherein there is provided a plurality of said capacitive coupling elements each connected with a respective one of said voltage dividers.

4. Actuation circuit according to claim 2, wherein the center taps of said voltage dividers are connected by said at least one capacitive coupling element.

5. Actuation circuit according to claim 1, wherein one of said voltage dividers is connected with one of said control terminals and another of said voltage dividers is connected with the other of said control terminals of said galvanomagnetic sensor, and wherein said voltage dividers have a common end connected to a common output terminal of said galvanomagnetic sensor.

6. Actuation circuit according to claim 5, wherein said common output terminal of said galvanomagnetic sensor is connected via said at least one capacitive coupling element with the common end of said voltage dividers, the other output terminal of said galvanomagnetic sensor is in communication with one input of each of said differential amplifier stages, and the other inputs of said differential amplifier stages are connected, respectively, with the center taps of said voltage dividers.

7. Actuation circuit according to claim 6, including a common resistor via which said other output terminal of said galvanomagnetic sensor is connected with said one input terminal of each of said differential amplifier stages.

8. Actuation circuit according to claim 7, wherein said common resistor has a resistance value that is approximately equal to half the differential internal resistance at the respective center taps of said voltage dividers.

9. Actuation circuit according to claim 5, including a common resistor, wherein said common output terminal of said galvanomagnetic sensor is connected directly with said common end of said voltage dividers, the other output terminal of said galvanomagnetic sensor is connected, via said at least one capacitive coupling element, with one input of each of said differential amplifier stages, said at least one capacitive coupling element also being connected, via said common resistor, with said common output terminal of said galvanomagnetic sensor, and each of the other inputs of said differential amplifier stages are connected directly with a respective one of the center taps of said voltage dividers.

10. Actuation circuit according to claim 5, wherein there is provided a plurality of capacitive elements, said common output terminal of said galvanomagnetic sensor is connected directly with said common end of said voltage dividers, and said common end is additionally in communication with one input of each of said differential amplifier stages and the other output terminal of said galvanomagnetic sensor is connected, via a respective one of said capacitive coupling elements, with a respective one of the other inputs of said differential amplifier stage, and said other inputs of said differential amplifier stages are each additionally connected with a respective one of the center taps of said voltage dividers.

11. Actuation circuit according to claim 10, including a resistor and wherein said common output terminal of said galvanomagnetic sensor is connected via said resistor with one input terminal of each differential amplifier stage.

12. Actuation circuit according to claim 1, wherein said voltage dividers have their second ends connected with the same control terminal of said galvanomagnetic sensor and their first ends connected to the same output terminal of said galvanomagnetic sensor; the center tap of a first one of said voltage dividers is connected with one input of each of said differential amplifier stages and, via said at least one capacitive coupling element, with the other of said output terminals of the galvanomagnetic sensor; said first end of a second one of said voltage dividers is connected with the other of said inputs of one differential amplifier stage and the center tap of said second voltage divider is connected with the other input of another of said differential amplifier stages.

13. Actuation circuit according to claim 12, wherein said voltage dividers are each comprised of two resistors, one of which resistors is smaller than the other and the voltage drop across the smaller resistor of said first voltage divider is half as much as the voltage drop across the smaller resistor of said second voltage divider.

14. Actuation circuit according to claim 1, wherein a first of said voltage dividers is connected with one control terminal and with one output terminal of said galvanomagnetic sensor; a second of said voltage dividers is connected with the center tap of said first voltage divider and with the other of said control terminals of the galvanomagnetic sensor; the center tap of said first voltage divider is additionally connected, via said at least one capacitive coupling element, with said other output terminal of said galvanomagnetic sensor and with one input of one differential amplifier stage; the center tap of said second voltage divider is connected with one input of another of said differential amplifier stages; and the other inputs of said one and another differential amplifier stages are jointly connected with said one output terminal of said galvanomagnetic sensor.

15. Actuation circuit according to claim 1, including a common resistor and wherein one of said inputs of each of said differential amplifier stages is connected, via said common resistor, with one output terminal of said galvanomagnetic sensor.

16. Actuation circuit according to claim 1, wherein said voltage dividers are constituted by three series connected resistors having two taps and connected between said two control terminals of said galvanomagnetic sensor; said two taps are each connected with one input terminal of a respective one of said differential amplifier stages, the other inputs of said differential amplifier stages are connected with one output terminal of said galvanomagnetic sensor; and at least one of said taps is connected, via said at least one capacitive coupling element, with the other output terminal of said galvanomagnetic sensor.

17. Actuation circuit for a brushless D.C. motor having a plurality of stator windings, comprising:
   a. a galvanomagnetic sensor having two control terminals and two output terminals;
   b. a plurality of end stage transistors, each having a control electrode and a main conductive path arranged for series connection to a respective one of the stator windings of the brushless motor;
   c. a plurality of differential amplifier stages, each having a high voltage gain and a high input resistance and provided with first and second inputs and an output, said output being connected to said control electrode of a respective one of said end stage transistors;
   d. ohmic voltage dividers, one for each of said differential amplifier stages, each of said voltage dividers having a first and a second end and a center tap, with said first end being connected to an output terminal of said galvanomagnetic sensor, said second end being connected to a control terminal of said galvomagnetic sensor and said center tap being connected to one input of a respective one of said diferential amplifier stage, said voltage dividers utilizing part of a voltage between said control terminals of said galvanomagnetic sensor to form switching thresholds for said differential amplifier stages; and
   e. at least one capacitive coupling element means, connected between said voltage dividers, for passing an alternating voltage component of an output signal of said galvanomagnetic sensor to one of said differential amplifier stages while suppressing a direct voltage component of said output signal, thereby rendering said end stage transistors non-conductive upon blocking of said motor represented by the absence of said alternating voltage component.

18. Actuation circuit for a brushless D.C. motor having a plurality of stator windings, comprising:
   a. a galvanomagnetic sensor having two control terminals and two output terminals;
   b. a plurality of end stage transistors each having a control electrode and a main conductive path arranged for series connection to a respective one of the stator windings of the brushless motor;
   c. a plurality of differential amplifier stages, each having a high voltage gain and a high input resistance and provided with first and second inputs and an output, said output being connected to said control electrode of a respective one of said end stage transistors;
   d. ohmic voltage divider means, connected between said control terminals of said galvanomagnetic sensor, for providing part of a voltage between said control terminals of said galvanomagnetic sensor to said first inputs of said differential amplifier stages to form switching thresholds for said differential amplifier stages, said second inputs of said differential amplifier stages being connected to one output terminal of said galvanomagnetic sensor; and
   e. at least one capacitive coupling element connected between one output terminal of said galvanomagnetic sensor and said voltage divider means for passing an alternating voltage component of an output signal of said galvanomagnetic sensor to one of said differential amplifier stages while suppressing a direct voltage component of said output signal, thereby rendering said end stage transistors non-conductive upon blocking of said motor represented by the absence of said alternating voltage component.

* * * * *

UNITED STATES PATENT AND TRADEMARK OFFICE
CERTIFICATE OF CORRECTION

PATENT NO. : 4,724,365
DATED : February 9, 1988
INVENTOR(S) : Rolf Müller

It is certified that error appears in the above-identified patent and that said Letters Patent is hereby corrected as shown below:

In the heading of the patent, insert the following section:

--FOREIGN APPLICATION PRIORITY DATA

April 12th, 1985 [DE] Fed. Rep. of Germany ...... 35 13 167           --.

Signed and Sealed this

Fifth Day of July, 1988

Attest:

DONALD J. QUIGG

Attesting Officer

Commissioner of Patents and Trademarks